United States Patent
Urata

[19]

[11] Patent Number: 6,128,358

[45] Date of Patent: *Oct. 3, 2000

[54] BIT SHIFT DETECTING CIRCUIT AND SYNCHRONIZING SIGNAL DETECTING CIRCUIT

[75] Inventor: Kaoru Urata, Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/736,731

[22] Filed: Oct. 25, 1996

[30] Foreign Application Priority Data

Oct. 30, 1995 [JP] Japan .................................... 7-282236

[51] Int. Cl.⁷ ...................................................... H04L 7/00
[52] U.S. Cl. ........................... 375/366; 375/359; 714/775
[58] Field of Search ..................................... 375/354, 359, 375/365, 366, 368, 371; 371/42, 37.03; 714/777, 775

[56] References Cited

U.S. PATENT DOCUMENTS

| | | |
|---|---|---|
| 3,656,109 | 4/1972 | Conway ................................ 340/146.2 |
| 3,710,026 | 1/1973 | Graham et al. ..................... 179/15 AL |
| 3,818,442 | 6/1974 | Solomon . |
| 4,389,636 | 6/1983 | Riddle, Jr. . |
| 4,414,662 | 11/1983 | Bousquet . |
| 4,541,095 | 9/1985 | Vries .......................................... 371/69 |
| 4,649,543 | 3/1987 | Levine ...................................... 371/41 |
| 4,914,535 | 4/1990 | Weng . |
| 5,148,453 | 9/1992 | Newby et al. . |
| 5,406,569 | 4/1995 | Isozaki ..................................... 371/42 |

*Primary Examiner*—Chi H. Pham
*Assistant Examiner*—Jean B Corrielus
*Attorney, Agent, or Firm*—Frommer Lawrence & Haug, LLP.; William S. Frommer; Dennis M. Smid

[57] ABSTRACT

A bit shift value of a synchronizing signal is detected. That is, after respective hamming distances between data from the first part of the synchronization signal and the respective pre-detects words, which are calculated by hamming distance calculators, are respectively compared with a predetermined value by comparators, the compared results are encoded by an encoder and the results are output as the bit shift value. Such bit shift value may be utilized to shift positions of the synchronizing signals of synchronizing blocks.

2 Claims, 11 Drawing Sheets

LSB FIRST ← | 76 SY₀ | B4 SY₁ |

|  | PRE-DETECT WORD |
|---|---|
| ← PHASE0 → | 0110111000 |
| ← PHASE1 → | 1101110001 |
| ← PHASE2 → | 1011100010 |
| ← PHASE3 → | 0111000101 |
| ← PHASE4 → | 1110001011 |
| ← PHASE5 → | 1100010110 |
| ← PHASE6 → | 1000101101 |

| PRE-DETECT WORD | HAMMING DISTANCE |
|---|---|
| 0110111000 (PHASE0) | 5 |
| 1101110001 (PHASE1) | 6 |
| 1011100010 (PHASE2) | 5 |
| 0111000101 (PHASE3) | 5 |
| 1110001011 (PHASE4) | 0 |
| 1100010110 (PHASE5) | 5 |
| 1000101101 (PHASE6) | 5 |

| IN1 | IN2 | IN3 | IN4 | IN5 | IN6 | IN7 | OUT |
|---|---|---|---|---|---|---|---|
| 1 | × | × | × | × | × | × | 0 |
| 0 | 1 | × | × | × | × | × | 1 |
| 0 | 0 | 1 | × | × | × | × | 2 |
| 0 | 0 | 0 | 1 | × | × | × | 3 |
| 0 | 0 | 0 | 0 | 1 | × | × | 4 |
| 0 | 0 | 0 | 0 | 0 | 1 | × | 5 |
| 0 | 0 | 0 | 0 | 0 | 0 | 1 | 6 |
| 0 | 0 | 0 | 0 | 0 | 0 | 0 | 7 |

FIG.11A INPUT DATA

| ID₀ = FF | ID₀ = FE | ID₀ = FD | ID₀ = FC | ID₀ = FB | ID₀ = FA | ····

FIG.11B ONE SYNCHRONIZING BLOCK DELAYED DATA

| ID₀ = FF | ID₀ = FE | ID₀ = FD | ID₀ = FC | ID₀ = FB | ID₀ = FA | ····

FIG.11C SYNCHRONIZATION PULSE

FIG.11D FIVE SYNCHRONIZING BLOCK DELAYED DATA

| ID₀ = FF | ID₀ = FE | ····

FIG.11E SYNCHRONIZATION PULSE AFTER FORWARD RETURN PROCESSING

BIT SHIFT DETECTING CIRCUIT AND SYNCHRONIZING SIGNAL DETECTING CIRCUIT

BACKGROUND OF THE INVENTION

The present invention relates to a bit shift detecting circuit for detecting the amount of bit shift of a synchronizing signal included in a synchronizing block and a synchronizing signal detecting circuit using the bit shift detecting circuit.

Nowadays, in a video tape recorder which is what is called a VTR, a digital VTR capable of recording and reproducing an image with higher image quality than that of an analog VTR using a low carrier wave FM recording system has been put into practice with the aid of the development of a digital recording system.

Figure 1:
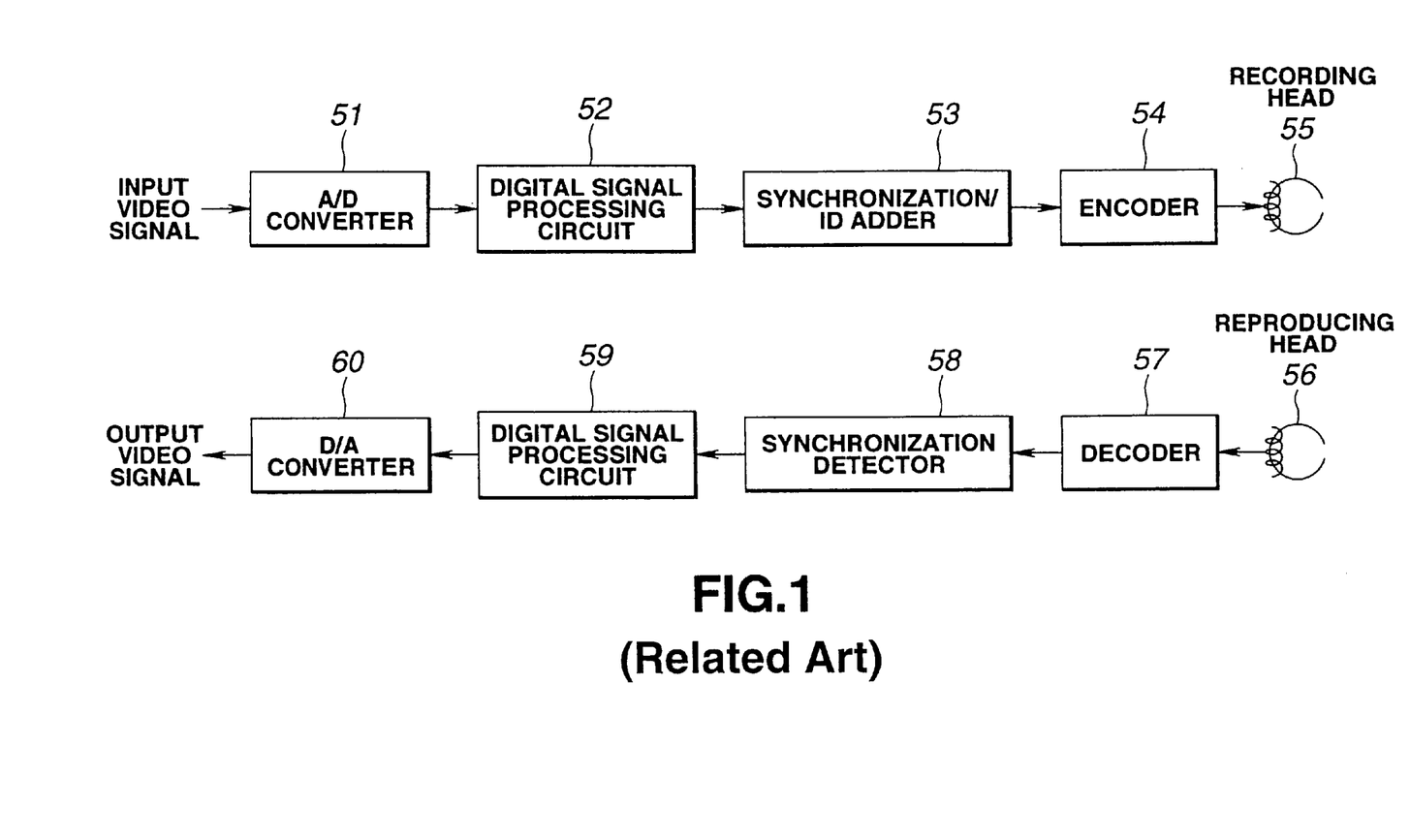
FIG. 1 is a schematic block diagram of a digital VTR.

The schematic configuration of the digital VTR is illustrated in FIG. 1.

In a recording system of the digital VTR, an analog video signal to be input is converted into a digital signal by an A/D (analog/digital) converter 51, the digital signal is quantized and the thus quantized digital signal is sent to a digital signal processing circuit 52.

In the digital signal processing circuit 52, the digital video signal is divided for respective blocks having a proper size, and then, the divided digital video signal is subjected to an orthogonal transformation and variable-length coding. The obtained coded signal undergoes shuffling and scrambling processings and an error correcting parity is applied to data. At this time, the parity relative to the vertical data of two-dimensionally arranged data is called an external code and the parity relative to the horizontal data is called an internal code. The processed data in this way is sent to a synchronization/ID adder 53.

In the synchronization/ID adder 53, a synchronizing signal of 2 bytes for detecting synchronization which is what is called a synchronization and an identification code of 3 bytes which is what is called an ID are applied to the sent signal and the signal is supplied to an encoder 54.

In the encoder 54, an encoding processing for an error correction and modification is executed for each frame of the supplied signal and a channel coding is carried out for converting the error-corrected and modified signal into a signal suitable for a high density recording, so that a recording signal is output. The recording signal is recorded on a magnetic tape through a recording head 55.

In the reproducing system, the recording signal on the magnetic tape is read by a reproducing head 56 and the read signal is supplied to a decoder 57. In the decoder 57, the reproduced signal is separated for respective frames and decoded and the decoded signal is supplied to a synchronization detector 58.

In the synchronization detector 58, a synchronization is detected from the sent signal and a data signal is demodulated based on the synchronization. The demodulated data is sent to a digital signal processing circuit 59.

In the digital signal processing circuit 59, the demodulated data is subjected to processings including an error correction, deshuffling and descrambling, and then, the processed data is subjected to a reverse orthogonal transformation so that a processing such as the expansion of data is effected.

The expanded data is converted into an analog signal by a D/A converter 60 and the analog signal is supplied to an external monitor or the like.

Figure 2:
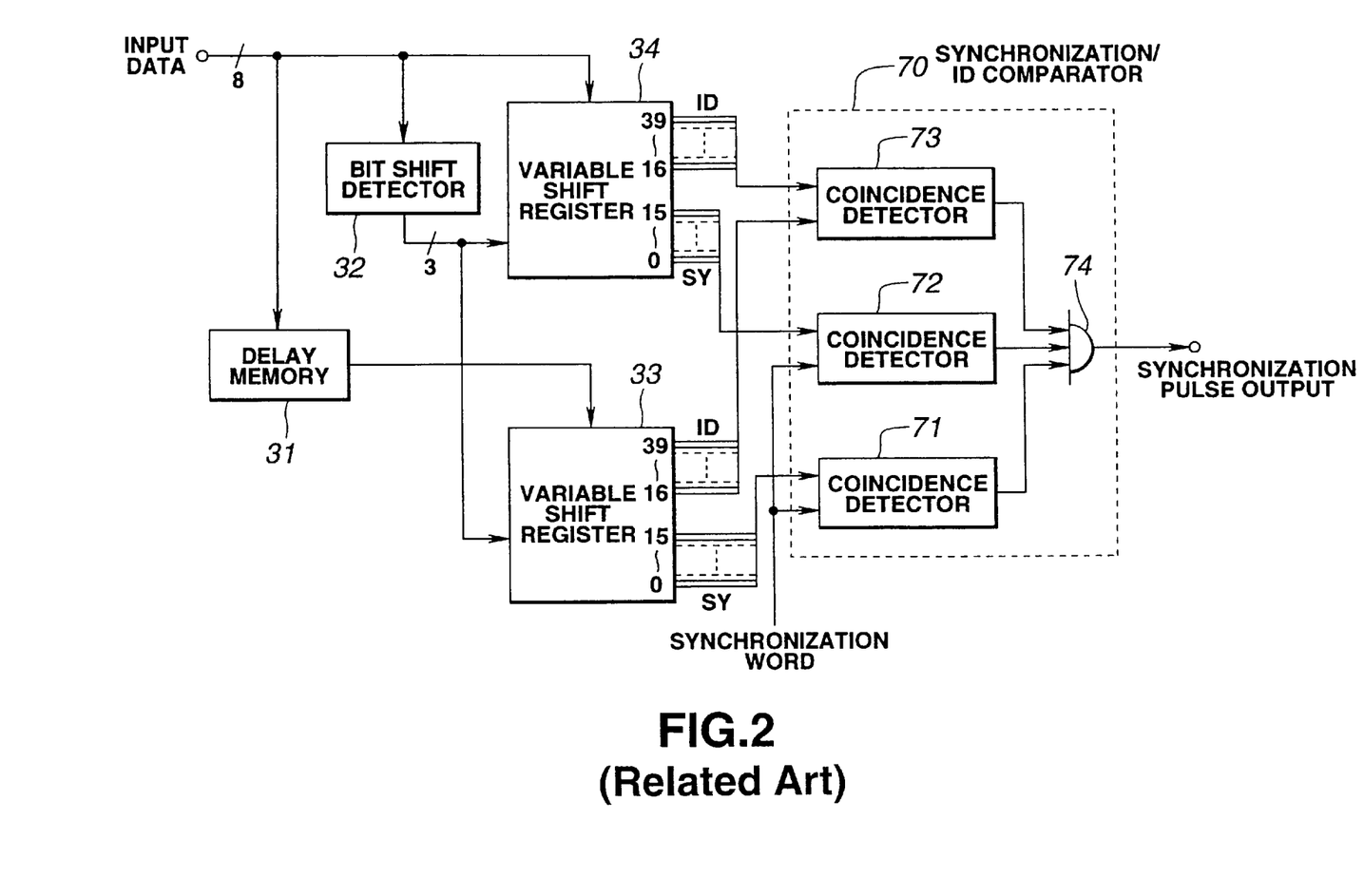
FIG. 2 is a schematic block diagram showing an example of a synchronizing signal detecting circuit.

Now, a schematic configuration of an example of a synchronizing signal detecting circuit which is what is called a synchronization detecting circuit is shown in FIG. 2, which detects a synchronization for each block of an internal code in the above described synchronization detector 58.

The data of the synchronizing block having a predetermined size obtained by adding the synchronization of 2 bytes and the identification code ID of 3 bytes or the like to the data output from the decoder 57 is input as parallel data of 8 bits to the above mentioned synchronization detecting circuit. The synchronization and the identification code ID of the synchronizing block data previously input are delayed by one synchronizing block in a delay memory 31 and the thus obtained input data is fed to a variable shift register 33. Further, the synchronization and the identification code ID of a synchronizing block input following the above mentioned synchronizing block are sent to the variable shift register 34 and also to a bit shift detector 32.

The parallel data of 8 bits to be input is not always interrupted at the first bit position of a leading synchronization SY of the synchronizing block. The interruption of the synchronizing block, that is, a phase is indeterminate. Therefore, the bit shift detector 32 detects the amount of shift of the first bit position of the synchronization SY of the synchronizing block input subsequently and outputs it as bit shift phase information to the variable shift register 33 and the variable shift register 34 respectively.

Figure 3A:
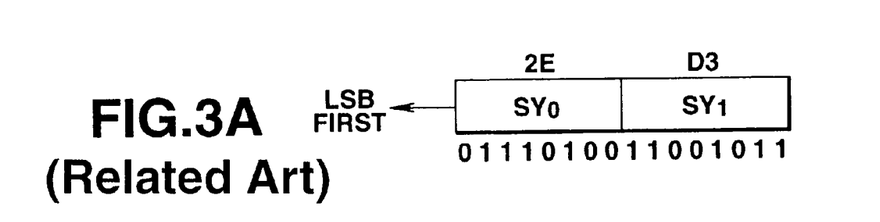
FIGS. 3A and 3B show the bit shift detecting operation of the synchronizing signal detecting circuit illustrated in FIG. 2.
Figure 3B:
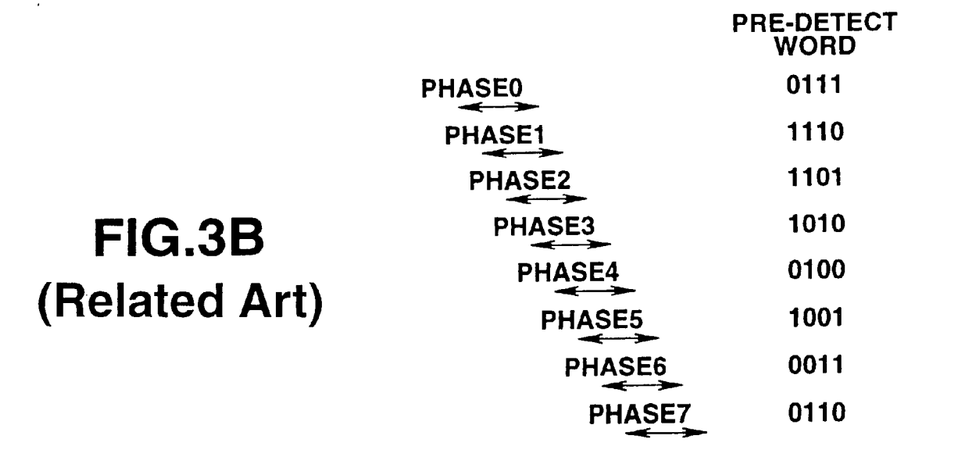

Herein, when the pattern of accurate synchronizations $SY_0$, $SY_1$ to be supplied to the bit shift detector 32 is, for example, '2E.D 3' in a hexadecimal notation, as shown in FIG. 3A, binary data is represented by '0111010011001011' from LSB (Least Significant Bit) first, that is, the least significant bit of the binary data. The value of '2E, 3D' also serves as a synchronization word to be sent to coincidence detectors 71 and 72. As illustrated in FIG. 3B, for this synchronization word, there are prepared eight kinds of different patterns respectively having 4 bits, which include PHASE 0 having the amount of shift of 0 bit to PHASE 7 having the amount of shift of 7 bits as pre-detect-words.

Accordingly, even if the break of eight bits of the synchronization $SY_0$ to be input to the bit shift detector 32, that is, its phase is indeterminate, the above mentioned plurality of pre-detect-words are used and it is detected which coincides with the pattern of the synchronization among these patterns, so that the bit shift value of the synchronization $SY_0$ from its correct bit position can be detected.

Thus, in the variable shift register 33 and the variable shift register 34, the supplied synchronization SY and identification code ID are changed from their break-points to correct bit positions. Then, the synchronization SY and identification code ID in the correct bit positions from the variable shift register 33 and the variable shift register 34 are respectively output to a synchronization/ID comparator 70.

Specifically explaining the above description, the synchronization SY of 0 to 15 bits from the variable shift register 33 is sent to a coincidence detector 71. The identification code ID of 16 to 39 bits is sent to a coincidence detector 73. The synchronization SY of 0 to 15 bits from the shift register 34 is supplied to a coincidence detector 72. The identification code ID of 16 to 39 bits is supplied to the coincidence detector 73.

In the coincidence detector 71, whether the data of synchronization SY of 16 bits after one synchronizing block is delayed coincides with a preset synchronizing word of 16 bits or not is detected. In the coincidence detector 72, whether the data of synchronization SY of 16 bits before one synchronizing block has not been yet delayed coincides with the above described synchronizing word of 16 bits or not is detected.

Further, in the coincidence detector 73, whether the data of identification code ID of 24 bits before one synchronizing block is not delayed coincides with the data of identification code ID of 24 bits after one synchronizing block is delayed or not is detected.

Outputs from the three coincidence detectors 71, 72 and 73 are input to an AND circuit 74, from which a synchronizing pulse is output when signals from the three coincidence detectors 71, 72 and 73 coincide together.

In this manner, the synchronization detector 58 detects a synchronization by employing the synchronizations and identification codes ID of the two synchronizing blocks.

As described above, since the eight kinds of pre-detectwords used in the bit shift detector 32 have 4 bits respectively, a hamming distance between any two among them is located within a range of 1 to 4. Therefore, if a decoding error of only one bit is generated in the synchronization data based on which the pre-detect-words are formed, the pattern of the synchronization data may possibly be different from the pattern of a correct pre-detect-word and coincide with the pattern of a different pre-detect-word. For example, when '0' is mistaken for the last '1' in '0111' of PHASE 0, PHASE 0 has the same value as '0110' of PHASE 7.

Therefore, in the case of a conventional bit shift detector, when a decoding error of not smaller than one bit is generated in the synchronization data, a bit shift value cannot be assuredly detected.

OBJECTS AND SUMMARY OF THE INVENTION

It is a primary object of the present invention to provide a bit shift detecting circuit by which the bit shift value of synchronization can be assuredly detected.

Another object of the present invention is to provide a synchronizing signal detecting circuit using the bit shift detecting circuit.

In order to realize the above mentioned object of the present invention, there is provided a bit shift detecting circuit for detecting the bit shift value of a synchronizing signal included in a synchronizing block comprising: hamming distance calculating means for respectively calculating hamming distances between a plurality of detection patterns, which respectively have a plurality of bits, are formed by shifting the pattern of the synchronizing signal one bit by one bit and have a hamming distance of a predetermined value therebetween or more, and the pattern of the synchronizing signal and outputting data showing the hamming distances; comparing means for respectively comparing the data showing the plurality of hamming distances output from the hamming distance calculating means with data showing the predetermined value; and a bit shift value outputting means for outputting data showing the bit shift value of the synchronizing signal based on comparison results output from the comparing means.

Further, in order to accomplish another object of the present invention, there is provided a synchronizing signal detecting circuit for detecting a synchronizing signal included in a synchronizing block comprising: a bit shift value detecting means for respectively calculating hamming distances between a plurality of detection patterns, which respectively have a plurality of bits, are formed by shifting the pattern of the synchronizing signal one bit by one bit and have a hamming distance of a predetermined value therebetween or more, and the pattern of the synchronizing signal and outputting the bit shift value of the synchronizing signal based on the results obtained by respectively comparing the plurality of hamming distances and the predetermined value; shift means for respectively shifting the bit positions of the synchronizing signals of the synchronizing block and a next synchronizing block subsequent to the synchronizing block, in accordance with the bit shift value from the bit shift value detecting means; and a synchronizing signal outputting means for outputting a synchronizing signal based on the comparison between the synchronizing signal of the synchronizing block and the synchronizing signal of the next synchronizing block.

DETAILED DESCRIPTION OF THE PREFERRED EMBODIMENTS

Referring to accompanying drawings, an explanation will now be given to embodiments of the present invention.

Figure 4:
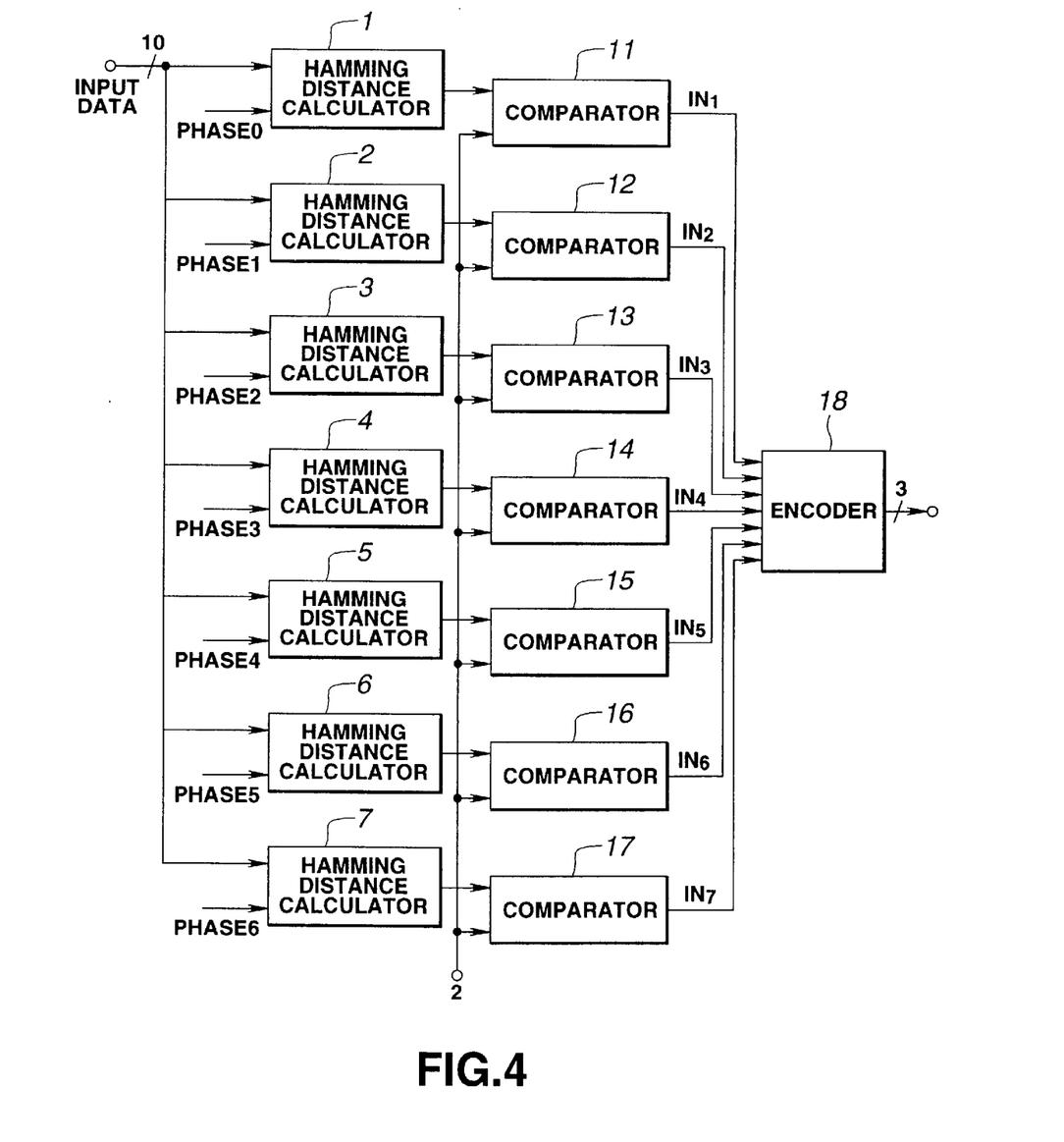
FIG. 4 is a block diagram showing an embodiment of a bit shift detecting circuit according to the present invention.

FIG. 4 is a schematic block diagram showing an embodiment of a bit shift detecting circuit according to the present invention.

This bit shift detecting circuit includes hamming distance calculators 1–7 for respectively calculating hamming distances between a plurality of detection patterns which are respectively constituted of a plurality of bits, formed by shifting the pattern of a synchronizing signal one bit by one bit and have a hamming distance of a predetermined value therebetween or more, and the pattern of the synchronizing signal, comparators 11 to 17 for respectively comparing the plurality of hamming distances from the hamming distance calculators 1 to 7 with the predetermined value and an encoder 18 as a bit shift value outputting means for outputting the bit shift value of the synchronizing signal based on the compared results.

Figure 5:
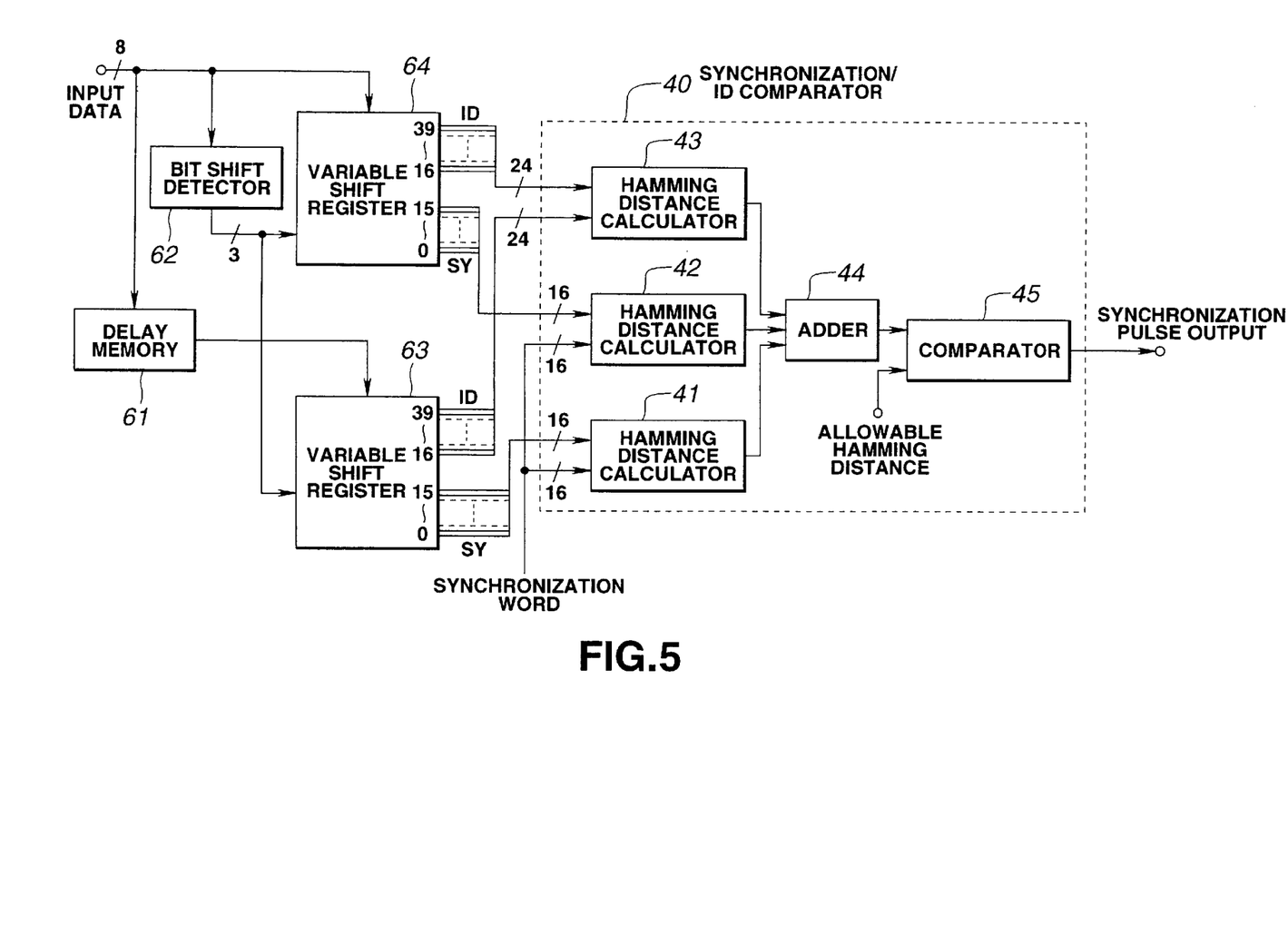
FIG. 5 is a block diagram showing an embodiment of a synchronizing signal detecting circuit according to the present invention.

FIG. 5 shows a synchronizing signal detecting circuit using the bit shift detecting circuit illustrated in FIG. 4. In FIG. 5, there is shown a schematic configuration of an embodiment of a synchronizing signal detecting circuit, what is called a synchronization detecting circuit for detecting a synchronizing signal, namely, synchronization by comparing synchronizations and identification codes ID using the hamming distances.

As shown in FIG. 5, the synchronization detecting circuit comprises a bit shift detector 62, which is a bit shift value detecting means, for respectively calculating hamming distances between a plurality of detection patterns which are respectively constituted of a plurality of bits, formed by shifting the pattern of a synchronizing signal one bit by one bit and have a hamming distance of a predetermined value therebetween or more, and the pattern of the synchronizing signal and outputting the bit shift value of the synchronizing signal in accordance with results obtained by respectively comparing the plurality of hamming distances with the predetermined value, variable shift registers 63 and 64 as shift means for respectively shifting the bit positions of the synchronizing signals of the synchronizing block and a next synchronizing block subsequent to the synchronizing block based on the bit shift value from bit shift detector 62 and a synchronization/ID comparator 40 as a synchronizing signal outputting means for outputting a synchronizing signal in accordance with the comparison between the synchronizing signal of the synchronizing block and the synchronizing signal of the next synchronizing block from the variable shift registers 63 and 64.

Initially, the bit shift detecting circuit shown in FIG. 4 will be described in more detail.

In the bit shift detecting circuit in FIG. 4, data of 10 bits from the leading part of synchronization SY is input to the hamming distance calculators 1 to 7 respectively. Further, the respective pre-detect-words of PHASE 0 to 6 composed of 10 bits are also respectively input to the hamming distance calculators 1 to 7. Thus, the hamming distance calculators 1 to 7 respectively calculate hamming distances between the data of 10 bits of the synchronization SY and the respective pre-detect-words.

Figure 6A:
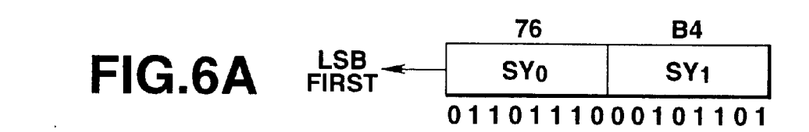
FIGS. 6A and 6B show the bit shift value detecting operation of the bit shift detecting circuit illustrated in FIG. 4.

Herein, when the values of accurate synchronization $SY_0$ and $SY_1$ supplied to the bit shift detector 62 are designated as, for example, '76.B4' in accordance with a hexadecimal notation as illustrated in FIG. 6A, binary data is represented by '0110111000101101' with LSB first. The value of '76,B4' is also the value of a synchronization word to be sent to hamming distance calculators 41 and 42 which will be described later. Using the value of this synchronization word, seven kinds of different patterns respectively having 10 bits, which include PHASE 0 having the shift value of 0 bit from the synchronization word to PHASE 6 having the shift value of 6 bits therefrom, are prepared as pre-detect-words.

Figure 6B:
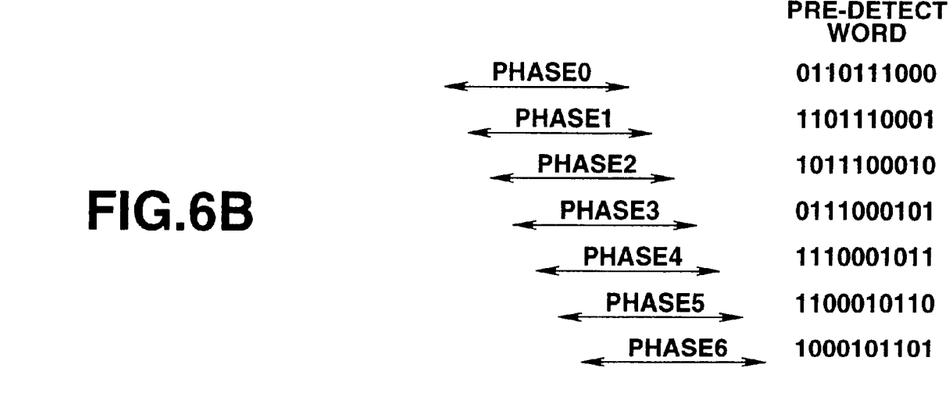

The hamming distances between the patterns of the pre-detects-words of these PHASEs 0 to 6 are respectively 5 or more. Accordingly, when a decoding error below 2 bits relative to the synchronization data is generated, one pre-detect-word can be discriminated from other pre-detect-words at the time of detecting the bit shift value. In other words, when the decoding error of the synchronization is within a range of 2 bits, the bit shift value can be detected.

Figure 7A:
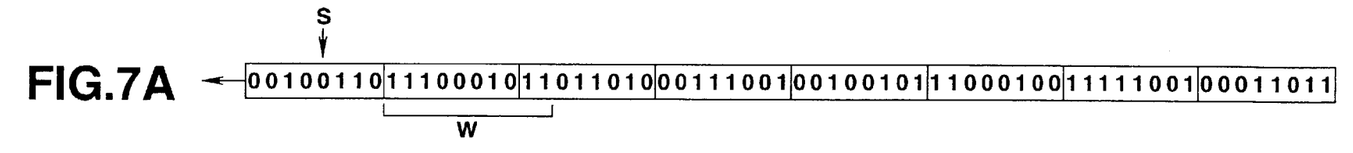
FIGS. 7A and 7B specifically show the bit shift value detecting operation of the bit shift detecting circuit illustrated in FIG. 4.
Figure 7B:
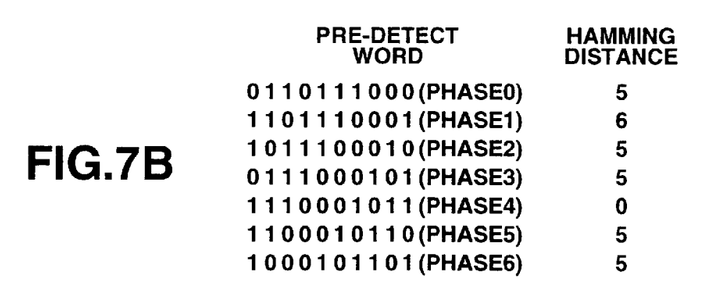

More specifically, as shown in FIG. 7A, the bit sequence of a synchronization $SY_0$ whose accurate leading bit is located at a position shown by S is input to the hamming distance calculators 1 to 7 in FIG. 4, the respective hamming distance calculators 1 to 7 compare the pre-detect-words of PHASE 0 to 6 with the data of 10 bits located in a range W so that respective hamming distances are obtained.

The hamming distances calculated by the hamming distance calculators 1 to 7 are respectively supplied to the comparators 11 to 17.

A value '2' is sent respectively to the comparators 11 to 17, where whether the respectively sent hamming distances are 2 or smaller or not is detected. Output results from these comparators 11 to 17 are respectively sent as data $IN_1$ to $IN_7$ to the encoder 18.

Figure 8:
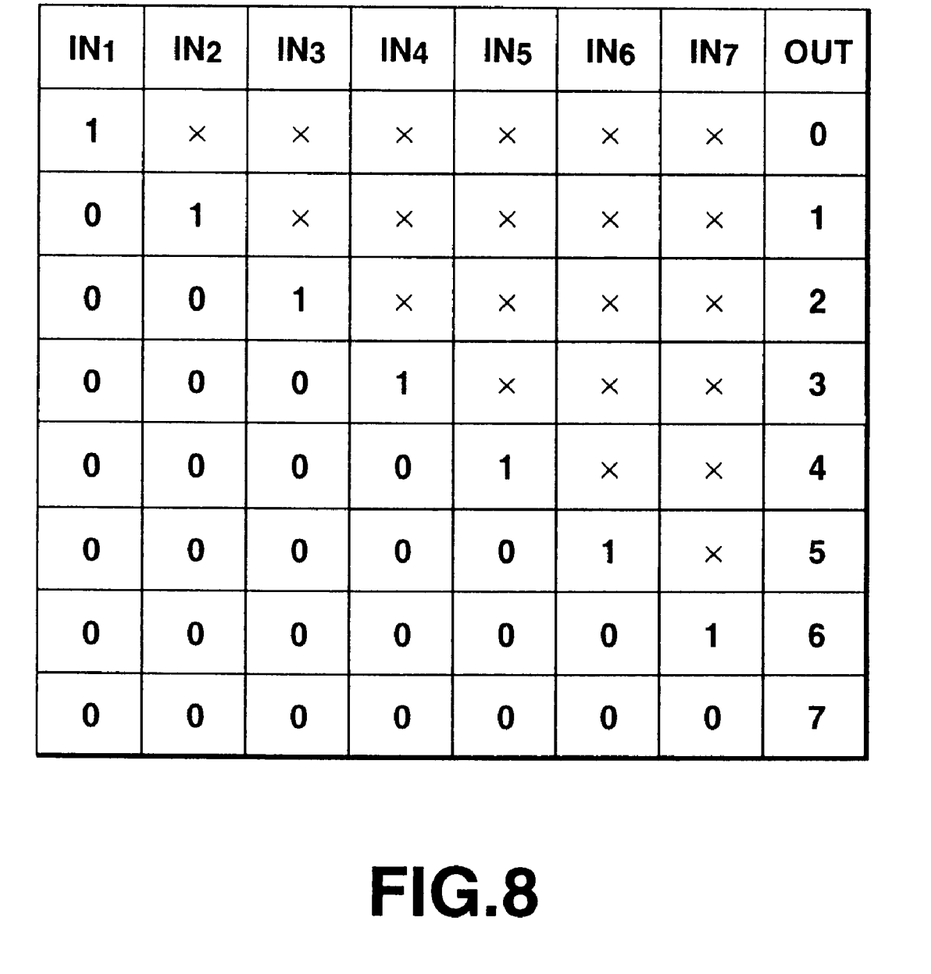
FIG. 8 shows the truth table of an encoder.

The encoder 18 outputs the supplied data $IN_1$ to $IN_7$ of 7 bits as data of 3 bits based on a truth table shown in FIG. 8.

In this case, any of the pre-detect-words having the shift values of 0 to 6 bits is to be considered to have 7 bit shift value when the pattern of the synchronization SY is not within 2 in the hamming distance.

As described above, such a synchronization pattern that the hamming distances of eight kinds of patterns of 0 to 7 bit shift values from the pattern of 10 bits located within the range W are respectively 5 or more is selected. Then, patterns among the plurality of pre-detect-words, which are compared with the pattern of the synchronization SY to be actually input so that hamming distances are located within 2, are detected, and thus, bit shift values are detected.

As the value of the synchronization SY, that is, the value of the synchronization word, not only '76.B4' but also such values as expressed below may be enumerated.

'89.4B' ('1001000111010010')
'2D.6E' ('1011010001110110')
'D2.91' ('0100101110001001')

Therefore, even when the decoding error of 2 bits is generated in the synchronization SY, correct bit shift values relative to the synchronization SY can be effectively and assuredly detected.

Now, the synchronizing signal detecting circuit shown in FIG. 5 will be described in more detail hereinbelow.

In FIG. 5, the synchronization/ID comparator 40 of the synchronizing signal detecting circuit includes a hamming distance calculator 41 as a first hamming distance calculating means for calculating a hamming distance between the pattern of a synchronizing signal of a synchronizing block and a reference synchronizing signal pattern, a hamming distance calculator 42 as a second hamming distance calculating means for calculating a hamming distance between the pattern of a synchronizing signal of a next synchronizing block and the reference synchronizing signal pattern, and a hamming distance calculator 43 as a third hamming distance calculating means for calculating a hamming distance between an identification code included in the synchronizing block and an identification code included in the next synchronizing block. The synchronization/ID comparator 40 outputs a synchronizing signal when the sum value of respective outputs from the hamming distance calculators 41, 42 and 43 is the value of a preset hamming distance or less.

More specifically described, the synchronization and the identification code ID of the synchronizing block of a predetermined size in which the synchronization of 2 bytes and the identification code ID of 3 bytes or the like are added to data are input as parallel data of 8 bits to the synchronizing signal detecting circuit seen in FIG. 5. The synchronization and the identification code ID of the synchronizing block which are previously input are delayed by one synchronizing block in a delay memory 61 and the delayed data is sent to the variable shift register 63. Further, the synchronization and the identification code ID of the synchronizing block input following the above described synchronizing block are supplied to the variable shift register 64 and to the bit shift detector 62.

The bit shift detector 62 carries out processing operations similar to those of the bit shift detecting circuit of FIG. 4 and detects the shift value of the first bit position of the synchronization SY in the subsequently input synchronizing block. This shift value is output, as bit shift phase information of 3 bits, respectively to the variable shift register 63 and the variable shift register 64. As a result, the variable shift register 63 and the variable shift register 64 change the break point of the supplied shift value to a correct bit position.

The synchronization SY with a correct bit position and the identification code ID are respectively output to the synchronization/ID comparator 40 from the variable shift register 63 and the variable shift register 64.

In the synchronization/ID comparator 40, the data of the synchronization SY having 16 bits, namely, 0 to 15 bits of the leading part of data output from the variable shift register 63 is sent to the hamming distance calculator 41. Further, the data of identification code ID of 24 bits from 16 to 39 bits is sent to the hamming distance calculator 43.

On the other hand, the data of the synchronization SY of 16 bits from 0 to 15 bits in the leading part of output data from the variable shift register 64 is sent to the hamming distance calculator 42. Further, the data of the identification code ID of 24 bits from 16 to 39 bits is supplied to the hamming distance calculator 43.

The hamming distance calculator 41 calculates a hamming distance between the data of the synchronization SY of 16 bits in the preceding block delayed by one synchronizing block and a preset synchronization word of 16 bits. The hamming distance calculator 42 calculates a hamming distance between the data of the synchronization SY of 16 bits in the synchronizing block before and after one synchronizing block delay and the above described synchronization word of 16 bits. Further, the hamming distance calculator 43 calculates a hamming distance between the data of the identification code ID of 24 bits before delay of one synchronizing block and the data of the identification code ID of 24 bits after delay of one synchronizing block.

The outputs from the three hamming distance calculators 41, 42 and 43 are input to and added in an adder 44 from which the sum value of the three hamming distances is output. The output from the adder 44 is supplied to a comparator 45.

The comparator 45 compares the output from the adder 44 with a preset and input allowable hamming distance. If the sum value from the adder 44 is the value of the allowable hamming distance, namely, 2 or less, as a result of comparison, it will be decided that a synchronization is detected, and then, a synchronization pulse will be output.

As mentioned above, the bit shift detecting circuit shown in FIG. 4 is combined with the synchronization/ID comparator 40 having the hamming distance of 2 or smaller, so that a shift detecting circuit capable of detecting an accurate bit shift value can be realized.

Figure 9:
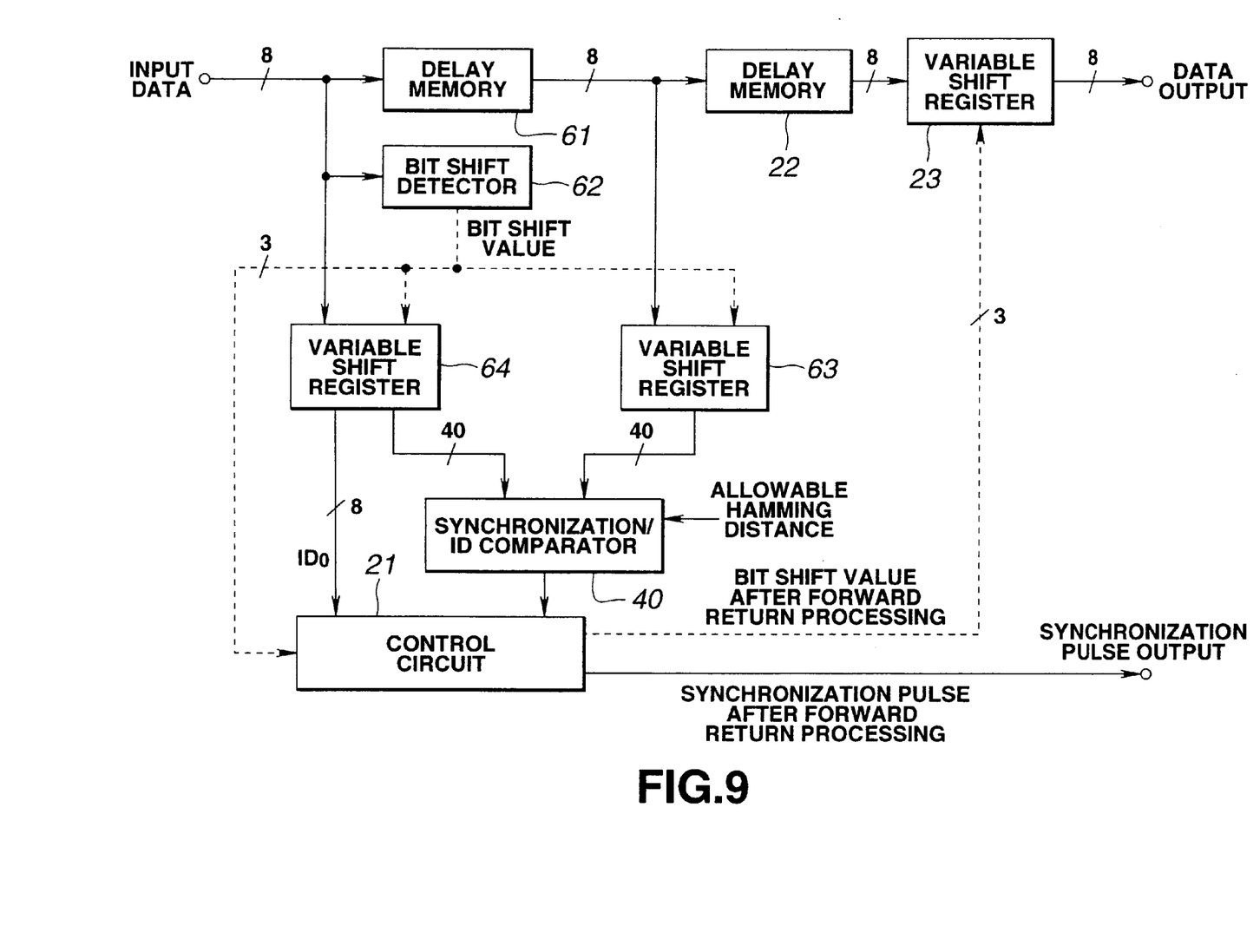
FIG. 9 is a block diagram showing another embodiment of a synchronizing signal detecting circuit according to the present invention.

Next, a description will be given to another embodiment of the synchronizing signal detecting circuit using the bit shift detecting circuit illustrated in FIG. 4 and the schematic configuration of this embodiment is seen in FIG. 9.

The synchronizing signal detecting circuit in FIG. 9 is a forward return type synchronizing signal detecting circuit and is provided with a synchronization/comparator 40 which is a synchronizing signal outputting means, a variable shift register 64 as a shift means and a control circuit 21 as a control means for delaying a synchronizing signal from the synchronization/ID comparator 40 on the unit of synchronizing block based on the value of the identification code of a next synchronizing block output from the variable shift register 64 and outputting the delayed synchronizing signal.

In the synchronizing signal detecting circuit shown in FIG. 9, components affixed with the same reference symbols as those shown in the synchronizing signal detecting circuit in FIG. 5 make similar operations to those described in the synchronizing signal detecting circuit in FIG. 5.

Specifically, the parallel data of a synchronizing block previously input to the forward return type synchronizing signal detecting circuit is delayed by one synchronizing block in a delay memory 61 and the synchronization and the identification code ID of the synchronizing block are sent to a variable shift register 63. Further, the synchronization and the identification code ID of a synchronizing block input subsequently to the above described synchronizing block are sent to a variable shift register 64 and to a bit shift detector 62.

The bit shift detector 62 detects the shift value of the bit position of the synchronization SY of the input synchronizing block and outputs it as bit shift phase information of 3 bits to the variable shift registers 63, 64 and a control circuit 21, respectively.

The variable shift registers 63 and 64 change the break point of the sent shift information to a correct bit position and respectively outputs the synchronization and the identification code ID of the correct bit position to a synchronization/ID comparator 40. The synchronization/ID comparator 40 calculates hamming distances of the input synchronization and identification code ID and outputs a synchronization pulse to the control circuit 21 based on the comparison between these hamming distances and an input allowable hamming distance, specifically, within a range of 2.

The variable shift register 64 outputs the data of 8 bits of the identification code $ID_o$ to the control circuit 21. The control circuit 21 applies a forward return processing for varying a delay value on the basis of synchronizing block unit to the sent bit shift value and the synchronization pulse, based on the value of the identification code $ID_o$.

Figure 10A:
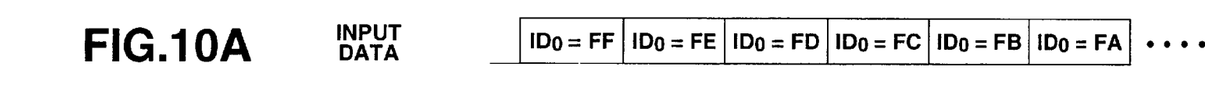
FIGS. 10A to 10E show timing charts of a signal in the processings of the synchronizing signal detecting circuit illustrated in FIG. 9.
Figure 10B:
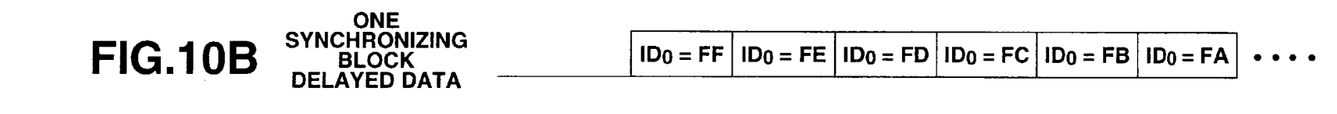
Figure 10C:
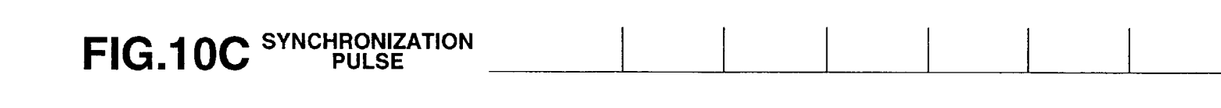
Figure 10D:
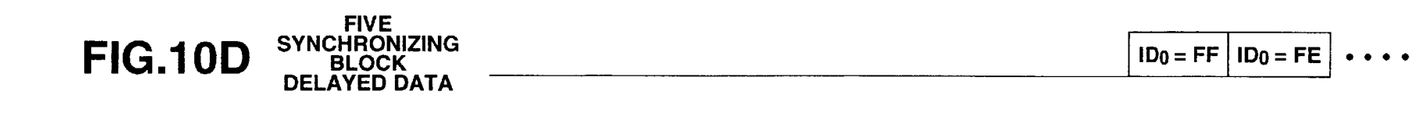
Figure 10E:
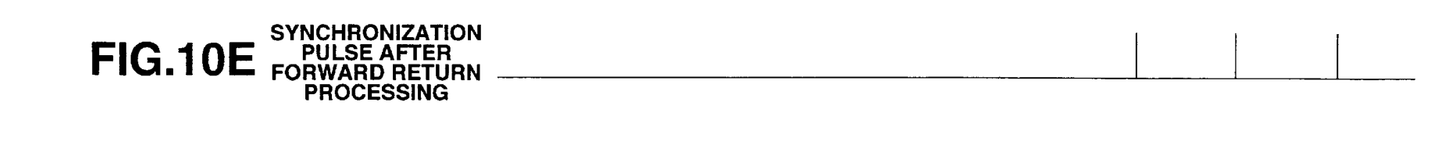

For example, when synchronization and identification code ID of a track or a sector shown in FIG. 10A are input from its first synchronizing block to the synchronizing signal detecting circuit, the data for every input synchronizing block is delayed by one synchronizing block in the delay memory 61 and the data as illustrated in FIG. 10B is input to the variable shift register 63. If the synchronization can be normally detected in the synchronization/ID comparator 40, after the bit positions of the synchronization are properly broken in the variable shift register 63, the synchronization pulse shown in FIG. 10C which corresponds to each synchronizing block in FIG. 10B will be output. Thereafter, the control circuit 21 delays the synchronization pulse from the synchronization/ID comparator 40, the identification code $ID_o$ from the variable shift register 64 and the bit shift value from the bit shift detector 62 by 5 synchronizing blocks, outputs the synchronization and the identification code ID of synchronizing blocks shown in FIG. 10D to the variable shift register 23 and outputs a synchronization pulse shown in FIG. 10E, which corresponds to each of the synchronizing blocks of FIG. 10D.

Figure 11A:
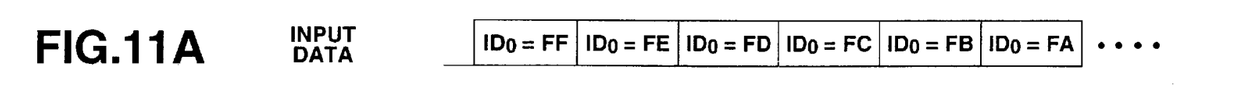
FIGS. 11A to 11E show another timing charts of a signal in the processings of the synchronizing signal detecting circuit illustrated in FIG. 9.

The delay memory 61 delays synchronization and identification codes ID of a track or a sector shown in FIG. 11A similar to FIG. 10A, from its first synchronizing block, by one synchronizing block and the delayed data for every synchronizing block is illustrated in FIG. 10B. It is assumed that, when the data for every synchronizing block is input to the synchronization/ID comparator 40, synchronization detecting errors are produced in the first four synchronizing blocks so that a synchronization pulse cannot be output.

Figures 11B, 11C:
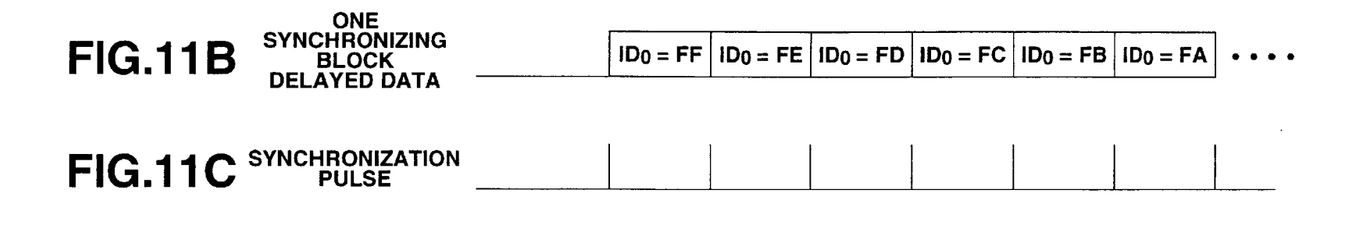
Figures 11D, 11E:
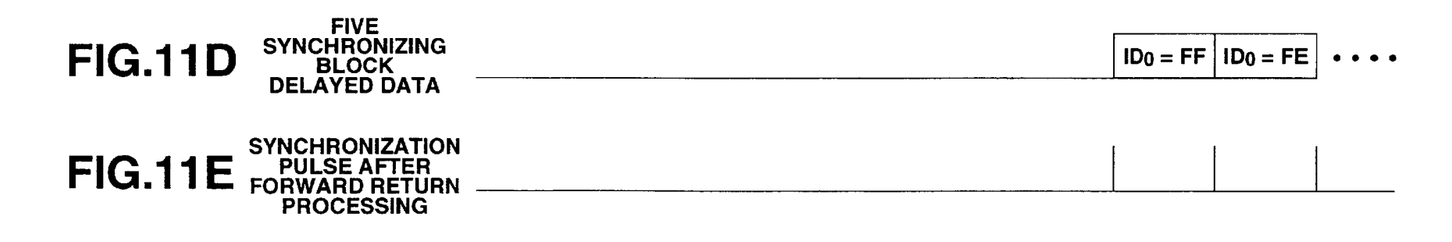

In this case, the control circuit 21 examines the identification code $ID_o$ of a synchronizing block in which the synchronization can be detected. If the synchronizing block from which the synchronization can be detected is, for example, a fifth synchronizing block from the first block with the value of the identification code $ID_o$ of 'FB' in a hexadecimal notation, a synchronization pulse shown in FIG. 11C is delayed by one synchronizing block, and the identification code $ID_o$ for the first four synchronizing blocks is interpolated by employing periodicity, so that a synchronization pulse, shown in FIG. 11E, of the first synchronizing block whose identification code $ID_o$ is 'FF', can be output after the data of the synchronizing block shown in FIG. 11 B is delayed by five synchronizing blocks.

The synchronization pulse detected as described above in accordance with the forward return processing is output outside and the bit shift value is supplied to a variable shift register 23.

In this connection, the data of the preceding synchronizing block delayed by one synchronizing block in the delay memory 61 is sent to a delay memory 22. The delay memory 22 delays the input data of the above described synchronizing block by synchronizing blocks to be delayed in the forward-return processing, for example, five synchronizing blocks in FIGS. 11 A to 11E. The data of the delayed synchronizing block is output to the variable shift register 23.

In the variable shift register 23, The synchronization $SY_0$ of the synchronizing block, whose break point is changed to a proper bit position based on the bit shift value after the forward-return processing, from the control circuit 21, is output.

In the above mentioned synchronizing signal detecting circuit, since the bit shift detecting circuit illustrated in FIG. 4 is employed, even when the decoding error below 2 bits of the synchronization SY is generated, a correct bit shift value relative to the synchronization SY can be assuredly detected. Therefore, even when a synchronization detecting error is generated, the synchronization pulse can be output from the first synchronizing block in accordance with the forward-return processing.

As can be understood from the above description, according to the above mentioned bit shift detecting circuit, even when there is a decoding error in the synchronization pattern of the synchronizing block, the correct bit shift value relative to the synchronization pattern can be surely detected by outputting the bit shift value of a synchronizing signal based on the results obtained respectively comparing hamming distances between a plurality of detection patterns, which are respectively composed of a plurality of bits, formed by shifting the pattern of the synchronizing signal one bit by one bit, and have a hamming distance of a predetermined value therebetween or more, and the pattern of the synchronizing signal, with the predetermined value.

Further, in the above mentioned synchronizing signal detecting circuit, the bit shift value of the synchronizing signal is output depending on the results obtained by respectively comparing hamming distances between a plurality of detection patterns, which are respectively composed of a plurality of bits, formed by shifting the pattern of the synchronizing signal one bit by one bit and have a hamming distance of a predetermined value therebetween or more, and the pattern of the synchronizing signal, with the predetermined value. Then, the bit shift values of the synchronizing signals of the synchronizing block and a synchronizing block subsequent to the synchronizing block are respectively shifted based on the above described bit shift value and a synchronizing signal is output in accordance with the comparison between the synchronizing signal of the synchronizing block and the synchronizing signal of the synchronizing block subsequent thereto so that the synchronization can be effectively detected after the correct bit shift value is assuredly detected relative to the synchronization pattern under a parallel processing. Therefore, clock frequency low in byte unit is used as the clock frequency employed for a synchronization detecting processing so that consumed power can be lowered. Further, a synchronization detection error rate is controlled to a low value so that the synchronization can be detected with high performance.

What is claimed is:

1. A synchronizing signal detecting circuit for detecting a synchronizing signal included in a synchronizing block, said synchronizing signal detecting circuit comprising:

bit shift value detecting means for respectively calculating hamming distances between a plurality of detection patterns, which respectively have a plurality of bits and are formed by shifting a pattern of said synchronizing signal by one bit and have a hamming distance of at least a predetermined value therebetween, and the pattern of said synchronizing signal and outputting a bit shift value of said synchronizing signal based on the results obtained by respectively comparing the plurality of hamming distances and the predetermined value;

shift means for respectively shifting bit positions of synchronizing signals of said synchronizing block and a next synchronizing block subsequent to said synchronizing block, in accordance with the bit shift value from said bit shift value detecting means; and synchronizing signal outputting means for outputting a respective synchronizing signal based on a comparison between the synchronizing signal of said synchronizing block and the synchronizing signal of the next synchronizing block;

wherein said synchronizing signal outputting means comprises first hamming distance calculating means for calculating a hamming distance between the pattern of the synchronizing signal of said synchronizing block and a reference synchronizing signal pattern; second hamming distance calculating means for calculating a hamming distance between the pattern of the synchronizing signal of the next synchronizing block and the reference synchronizing signal pattern; and third hamming distance calculating means for calculating a hamming distance between an identification code included in said synchronizing block and an identification code included in the next synchronizing block, and wherein said synchronizing signal outputting means outputs a synchronizing signal when the sum value of respective outputs from said first, second and third hamming distance calculating means is no more than a value of a preset hamming distance.

2. A synchronizing signal detecting circuit for detecting a synchronizing signal included in a synchronizing block, said synchronizing signal detecting circuit comprising:

bit shift value detecting means for respectively calculating hamming distances between a plurality of detection patterns, which respectively have a plurality of bits and are formed by shifting a pattern of said synchronizing signal by one bit and have a hamming distance of at least a predetermined value therebetween, and the pattern of said synchronizing signal and outputting a bit shift value of said synchronizing signal based on the results obtained by respectively comparing the plurality of hamming distances and the predetermined value;

shift means for respectively shifting bit positions of synchronizing signals of said synchronizing block and a next synchronizing block subsequent to said synchronizing block, in accordance with the bit shift value from said bit shift value detecting means;

synchronizing signal outputting means for outputting a respective synchronizing signal based on a comparison between the synchronizing signal of said synchronizing block and the synchronizing signal of the next synchronizing block; and control means for delaying the synchronizing signal from said synchronizing signal outputting means by a synchronizing block unit based on a value of an identification code of said next synchronizing block from the shift means, and outputting the delayed synchronizing signal.

* * * * *